United States Patent
Akiyama et al.

(10) Patent No.: US 12,325,667 B2
(45) Date of Patent: Jun. 10, 2025

(54) PROCESSING METHOD FOR CERAMIC-BASED COMPOSITE MATERIAL

(71) Applicant: MITSUBISHI HEAVY INDUSTRIES, LTD., Tokyo (JP)

(72) Inventors: Hiromichi Akiyama, Tokyo (JP); Yasuhiko Tsuru, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 383 days.

(21) Appl. No.: 17/847,619

(22) Filed: Jun. 23, 2022

(65) Prior Publication Data
US 2022/0411338 A1   Dec. 29, 2022

(30) Foreign Application Priority Data
Jun. 25, 2021  (JP) .................................. 2021-105620

(51) Int. Cl.
| | |
|---|---|
| *C04B 35/80* | (2006.01) |
| *C04B 35/626* | (2006.01) |
| *C04B 35/628* | (2006.01) |
| *C04B 35/645* | (2006.01) |

(52) U.S. Cl.
CPC .......... *C04B 35/80* (2013.01); *C04B 35/6269* (2013.01); *C04B 35/62892* (2013.01); *C04B 35/645* (2013.01)

(58) Field of Classification Search
CPC ................ C04B 35/80; C04B 35/6269; C04B 35/62892; C04B 35/645; C04B 35/622
See application file for complete search history.

(56) References Cited

U.S. PATENT DOCUMENTS

| | | | |
|---|---|---|---|
| 5,240,888 A | * | 8/1993 | Yamamura ........ C04B 35/62873 428/699 |
| 5,281,439 A | | 1/1994 | Leluan et al. |
| 5,569,422 A | | 10/1996 | Astier et al. |

(Continued)

FOREIGN PATENT DOCUMENTS

| | | | | |
|---|---|---|---|---|
| CN | 101128310 A | * | 2/2008 | ............. B29C 65/18 |
| JP | 57-27802 | | 6/1982 | |

(Continued)

OTHER PUBLICATIONS

Notice of Reasons of Refusal mailed Oct. 15, 2024 in Japanese Patent Application No. 2021-105620, with Machine Translation.

*Primary Examiner* — Daniel McNally
(74) *Attorney, Agent, or Firm* — Wenderoth, Lind & Ponack, L.L.P.

(57) ABSTRACT

In a processing method for a ceramic-based composite material in which the ceramic-based composite material is molded by layering sheets obtained by impregnating reinforced fibers with a slurry containing ceramic powder and calcining the sheets after curing, the processing method includes layering the sheets in a layering direction to form a laminate, and covering the laminate with a vacuum bag and evacuating an inside of the vacuum bag to mold a cured laminate. In molding the cured laminate, a slurry-removing material configured to absorb excess slurry is disposed with respect to the laminate, and a degassing circuit member provided on at least one side of the laminate and configured to discharge air bubbles generated inside the laminate is disposed with respect to the laminate.

8 Claims, 4 Drawing Sheets

(56) References Cited

U.S. PATENT DOCUMENTS

| | | |
|---|---|---|
| 8,790,485 B2 | 7/2014 | Whitworth et al. |
| 9,108,395 B2 | 8/2015 | Whitworth et al. |
| 11,001,532 B2 | 5/2021 | Shim |
| 11,325,355 B2 | 5/2022 | Diss et al. |
| 11,787,159 B2 | 10/2023 | Shim |
| 2006/0191624 A1 | 8/2006 | Whitworth et al. |
| 2011/0139344 A1* | 6/2011 | Watson ............... B29C 73/32 156/499 |
| 2013/0116109 A1* | 5/2013 | Ritti ..................... C04B 35/80 264/642 |
| 2014/0299255 A1 | 10/2014 | Whitworth et al. |
| 2018/0305263 A1 | 10/2018 | Shim |
| 2021/0155552 A1* | 5/2021 | Diss ..................... C04B 35/117 |
| 2021/0230071 A1 | 7/2021 | Shim |

FOREIGN PATENT DOCUMENTS

| | | | |
|---|---|---|---|
| JP | 5-208864 | 8/1993 | |
| JP | 2947867 B2 * | 9/1999 | ............ B29C 43/12 |
| JP | 2008-531337 | 8/2008 | |
| JP | 2018-177635 | 11/2018 | |
| JP | 2019-81340 | 5/2019 | |
| JP | 2020-524654 | 8/2020 | |

* cited by examiner

PROCESSING METHOD FOR CERAMIC-BASED COMPOSITE MATERIAL

CROSS-REFERENCE TO RELATED APPLICATIONS

This application claims the benefit of priority to Japanese Patent Application Number 2021-105620 filed on Jun. 25, 2021. The entire contents of the above-identified application are hereby incorporated by reference.

TECHNICAL FIELD

The disclosure relates to a processing method for a ceramic-based composite material.

RELATED ART

A known processing method for a ceramic-based composite material is a manufacturing method for a ceramic-based composite material member in which slurry-impregnated sheets obtained by impregnating reinforced fibers with a slurry containing ceramic powder are subjected to press processing by applying pressure using a mold (see, for example, JP 2019-081340 A).

SUMMARY

In the manufacturing method of JP 2019-081340 A, quality can be ensured in a case of molding a thin ceramic-based composite material, but quality is difficult to ensure in a case of molding a thick ceramic-based composite material. Specifically, in a case of molding a thick ceramic-based composite material, the mold is long to suppress deformation of the mold or the composite material is very thick. Thus, degassing of the inside of the mold is insufficient and voids are formed, which results in processing defects more readily occurring. In particular, the slurry contains moisture, and so when sheets obtained by impregnating reinforced fibers with the slurry are evacuated, this moisture turns into air bubbles. As a result, air bubbles are more likely to occur than in resin-impregnated sheets obtained by impregnating reinforced fibers with a resin.

Thus, an object of the present disclosure is to provide a processing method for a ceramic-based composite material with which the ceramic-based composite material can be suitably molded while suppressing processing defects.

A processing method for a ceramic-based composite material of the present disclosure is a processing method for a ceramic-based composite material in which the ceramic-based composite material is molded by layering sheets obtained by impregnating reinforced fibers with a slurry containing ceramic powder and calcining the sheets after curing. The processing method includes a step of layering the sheets in a layering direction to form a laminate, and a step of covering the laminate with a vacuum bag and evacuating the inside of the vacuum bag to mold a cured laminate. In the step of molding the cured laminate, a slurry-removing material for absorbing excess slurry is disposed with respect to the laminate, and a degassing circuit member provided on at least one side of the laminate and for discharging air bubbles generated inside the laminate is disposed with respect to the laminate.

According to the present disclosure, a ceramic-based composite material can be suitably molded while suppressing processing defects.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments according to the present disclosure will be described in detail with reference to the drawings. Note that, the disclosure is not limited to the embodiments. In addition, components in the following embodiments include components that are substantially the same components or components that can be easily replaced by those skilled in the art. Furthermore, the components described below can be appropriately combined, and when there are a plurality of embodiments, each embodiment can be combined.

First Embodiment

Figure 1:
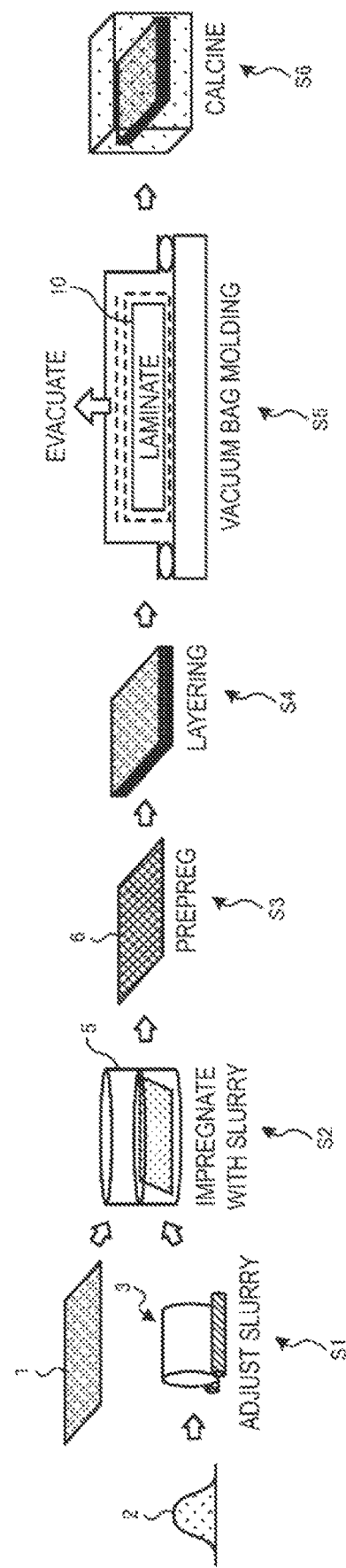
FIG. 1 is an explanatory view illustrating a processing method for a ceramic-based composite material according to a first embodiment.
Figure 2:
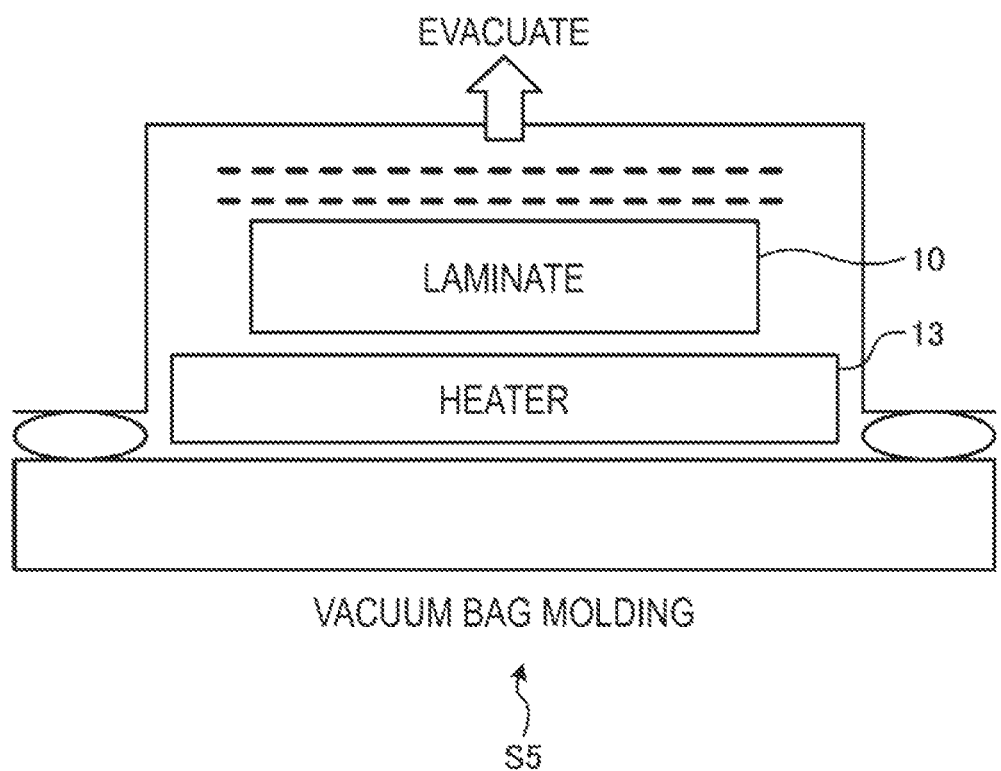
FIG. 2 is an explanatory view illustrating another example of the processing method for the ceramic-based composite material according to the first embodiment.
Figure 3:
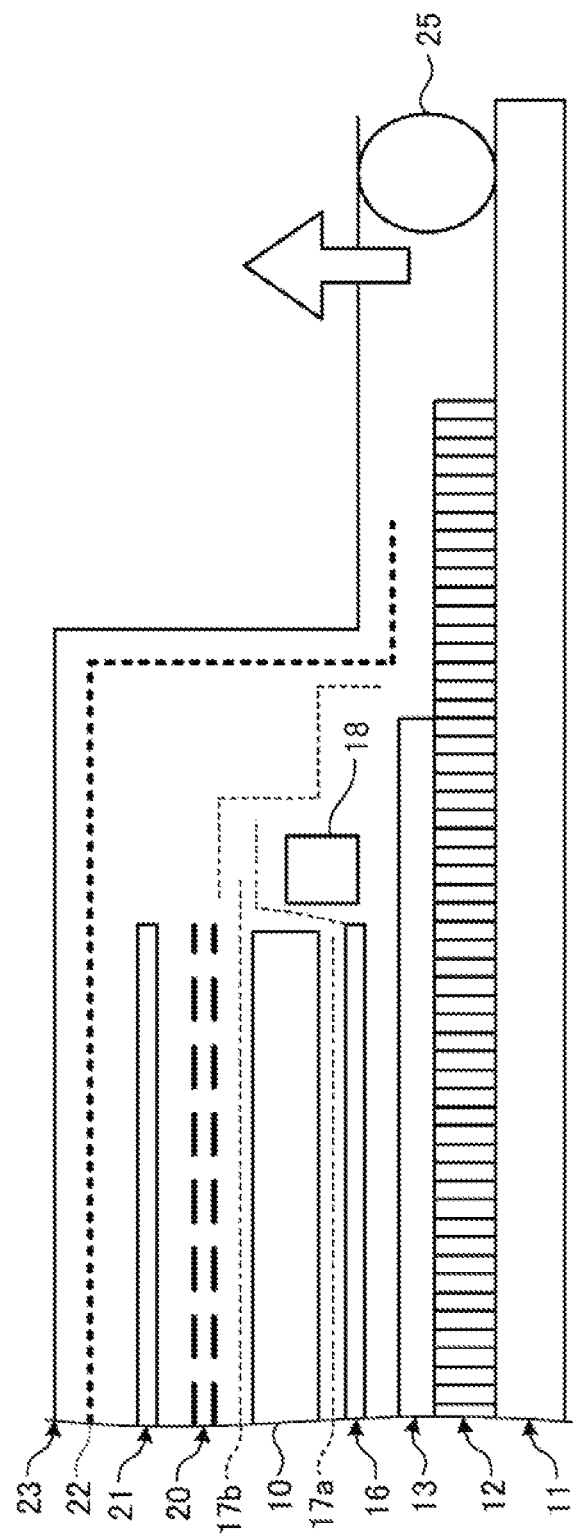
FIG. 3 is a cross-sectional view illustrating a multilayer structure.

FIG. 1 is an explanatory view illustrating a processing method for a ceramic-based composite material according to a first embodiment. FIG. 2 is an explanatory view illustrating another example of the processing method for the ceramic-based composite material according to the first embodiment. FIG. 3 is a cross-sectional view illustrating a multilayer structure.

The processing method for the ceramic-based composite material according to the first embodiment is a method of molding the ceramic-based composite material by layering sheets obtained by impregnating reinforced fibers with a slurry containing a ceramic powder and drying and curing the sheets, and then calcining the sheets. An example of the ceramic-based composite material is oxide-based ceramic matrix composites (CMCs). Note that the ceramic-based composite material is not particularly limited to the oxide-based CMCs, and any ceramic-based composite material may be used as long as it can be molded using the processing method of the present embodiment.

Processing Method for Ceramic-Based Composite Material

As illustrated in FIG. 1, in the processing method for the ceramic-based composite material, first, step S1 is performed. In step S1, a slurry 4 obtained by dispersing a ceramic powder 2 serving as a solute in a solvent is prepared. In the processing method of the first embodiment, an oxide-based ceramic powder is used as the ceramic powder 2, and specifically, alumina powder is used. In the processing method of the first embodiment, water is used as the solvent. In step S1, the ceramic powder 2 and water are fed into a stirring device 3 and mixed with each other, and thus the slurry is prepared. Note that, the materials are not particularly limited as long as the slurry contains a solute and a solvent with which the oxide-based CMC can be molded.

Subsequently, in the processing method for the ceramic-based composite material, step S2 is performed. In step S2, reinforced fiber sheets 1 are immersed in an impregnation tank 5 containing the slurry 4 prepared in step S1. In step S2, the reinforced fiber sheets 1 are impregnated with the slurry 4 in the impregnation tank 5 to form prepregs 6 (sheets) as slurry-impregnated sheets (step S3).

Subsequently, in the processing method for the ceramic-based composite material, step S4 is performed. In step S4, the prepregs 6 are layered in a layering direction to form a laminate 10. In step S4, the laminate 10 is formed by simply layering the prepregs 6 or by pressing the layered prepregs 6 with a plate or vacuum pressure or the like.

Subsequently, in the processing method for the ceramic-based composite material, step S5 is performed. In step S5, the laminate 10 is covered with a vacuum bag, and the inside of the vacuum bag is evacuated to mold a cured laminate. In step S5, there are a case where the laminate 10 is not heated by a heater as illustrated in FIG. 1, and a case where the laminate 10 is heated by the heater as illustrated in FIG. 2. Further, in the configuration illustrated in FIG. 1, there is a case where the laminate 10 is heated from the outside using an oven or the like. Referring now to FIG. 3, a multilayer structure will be described. This multilayer structure is obtained in step S5 when heating the laminate 10 by the heater.

As illustrated in FIG. 3, in step S5, first, a molding die 11 is prepared. The molding die 11 serves as a table on which the laminate 10 is installed. For example, a metal material such as aluminum or iron is used for the molding die 11. Note that a composite material may be used for the molding die 11. A breather 12 serving as a heat insulating member is disposed on a top surface of the molding die 11. The breather 12 suppresses the transfer of heat to the molding die 11. A heating mat 13 is disposed on a top surface of the breather 12. The heating mat 13 is a heat source for heating the laminate 10. A shaping member 16 for shaping the laminate 10 (cured laminate after curing) into the desired molded shape is provided on a top surface of the heating mat 13. The shaping member 16 is formed of, for example, a carbon fiber composite material, and is a member used for shaping the cured laminate into a predetermined shape.

The laminate 10 is disposed on a top surface of the shaping member 16 via a peel ply 17a. The peel ply 17a disposed on a lower side of the laminate 10 is a layer used for peeling off the cured laminate 10 from the shaping member 16. Note that the peel ply 17a also has a function of absorbing excess slurry 4 contained in the laminate 10, and also functions as a degassing circuit during evacuation. Further, a dam member 18 for suppressing outflow of the prepregs 6 from the laminate 10 is disposed on the top surface of the heating mat 13 serving as a periphery of the laminate 10.

A slurry-removing material 20 is provided on a top surface of the laminate 10 via a peel ply 17b. The peel ply 17b provided on the upper side of the laminate 10 is a layer used for peeling off the cured laminate 10 from the slurry-removing material 20. Note that the peel ply 17b also functions as a degassing circuit during evacuation. The slurry-removing material 20 is formed by, for example, overlaying a plurality of glass cloths, and absorbs the excess slurry 4 contained in the laminate 10. Further, the slurry-removing material 20 functions as a degassing circuit member serving as a flow path for degassing the laminate 10 during evacuation. The slurry-removing material 20 serving as the degassing circuit member discharges air bubbles generated inside the laminate 10.

A pressure plate 21 (pressing plate) for pressing the laminate 10 is provided on a top surface of the slurry-removing material 20. The pressure plate 21 is formed of, for example, a carbon fiber composite material or a metal material or the like, and has a flat plate-like shape. Note that although the shape of the pressure plate 21 has the flat plate-like shape, the shape is not particularly limited and can be any shape provided that the shape is suitable for molding the laminate 10. Further, the pressure plate 21 has a simple flat plate-like shape (without through-holes), but through-holes may be formed through the plate thickness direction. In this case, the pressure plate 21 can discharge the air bubbles generated inside the laminate 10 via the through-holes of the pressure plate 21 during evacuation.

A breather 22 is disposed on a top surface of the pressure plate 21. The breather 22 functions as a member for discharging the atmosphere inside a vacuum bag 23 that covers the laminate 10 during evacuation. The breather 22 also functions as the degassing circuit member for discharging the air bubbles generated inside the laminate 10. In a case where the through-holes are formed in the pressure plate 21, degassing can be performed from the top surface of the laminate 10, and the degassing can be promoted.

A top surface of the breather 22 is covered with the vacuum bag 23. Further, a sealing member 25 is provided between the vacuum bag 23 and the molding die 11. Thus, the inside of the vacuum bag 24 is hermetically sealed. A suction port (not illustrated) is provided in the vacuum bag 23.

In the multilayer structure as described above, when the evacuation is performed via the suction port, the laminate 10 is pressed by atmospheric pressure via the pressure plate 21, and the laminate 10 is heated by the heating mat 13. Thus, in step S5, the laminate 10 is pressed and heated to dry and cure the laminate 10, whereby the laminate 10 becomes a cured laminate.

In step S5, during the heating of the laminate 10, the heating is performed from one side in the layering direction of the laminate 10 by the heating mat 13, and the degassing is performed from the other side in the layering direction via the slurry-removing material 20. That is, in step S5, the heating and curing are started from a part of the laminate 10 closer to the heat source, and the degassing is started from a part of the laminate 10 farther from the heat source.

Then, in the processing method for the ceramic-based composite material, step S6 is performed. In step S6, the cured laminate formed in step S5 is calcined in a calcining furnace such as an electric furnace. By performing step S6, the cured laminate is calcined to form a molded ceramic-based composite material.

Note that, although the prepregs 6 are layered in step S4 of the first embodiment, the slurry 4 may be applied to the surface of the prepregs 6 after layering the prepregs 6. Thus, even in a case where the slurry 4 is insufficient on the surface of the prepregs 6 and voids are formed, gaps can be filled by the slurry 4 by applying the slurry 4, and thus defects of the slurry 4 can be suppressed.

Further, in step S4 of the first embodiment, after layering the prepregs 6, the prepregs 6 may be covered with the vacuum bag, and the inside of the vacuum bag may be evacuated. As a result, even in a case where the prepregs 6 entrain air during layering, the air can be removed by performing the evacuation, and thus the formation of voids can be suppressed. Note that, in step S4, by performing the evacuation, the air is removed and the excess slurry 4 may also be removed. In this case, since the excess slurry 4 is removed in advance, a gas-permeable film such as a perforated release film may be disposed between the laminate 10 and the peel ply 17b. At this time, the slurry-removing material 20 functions as the degassing circuit member. Note that the gas-permeable film provided between the laminate 10 and the slurry-removing material 20 may be disposed in step S5 of the first embodiment.

Further, in step S6 of the first embodiment, pressure may be applied to the cured laminate. In this case, in step S6, the pressure applied to the cured laminate during calcining may be increased over the pressure applied to the laminate 10 during the molding of step S5 so that the pressure applied to the cured laminate during the calcining increases. Because the pressure applied to the cured laminate during the calcining can be increased, cracking can be suppressed even in a case where the cured laminate has residual strain. Note that the pressurization in step S6 is more effective in the second embodiment described below.

Further, in the first embodiment, the slurry-removing material 20 serving as the degassing circuit member is disposed closer to the upper side of the laminate 10, but another degassing circuit member may be provided closer to the lower side of the laminate 10.

Further, in the first embodiment, the slurry-removing material 20 serving as the degassing circuit member is disposed closer to the upper side of the laminate 10 and the heating mat 13 is disposed closer to the lower side of the laminate 10, but the positions of the slurry-removing material 20 and the heating mat 13 may be reversed.

Second Embodiment

Figure 4:
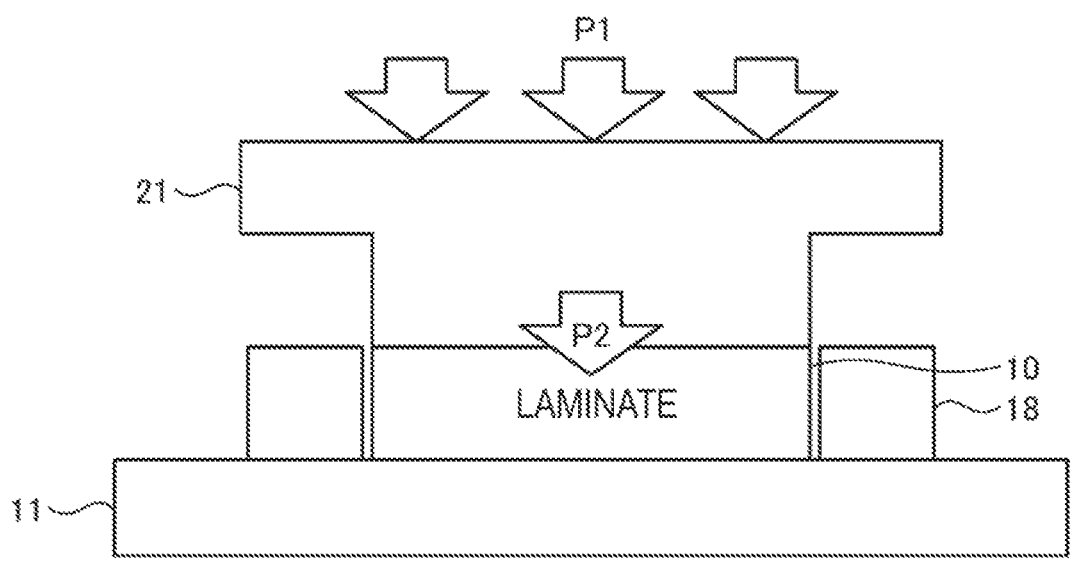
FIG. 4 is a cross-sectional view illustrating a multilayer structure in a processing method for a ceramic-based composite material according to a second embodiment.

A second embodiment will be described next with reference to FIG. 4. In the second embodiment, in order to avoid redundant descriptions, descriptions will be given only for structural elements different from those of the first embodiment, and the same reference numerals will be assigned to structural elements having the same configuration as that of the first embodiment. FIG. 4 is a cross-sectional view illustrating a multilayer structure in a processing method for a ceramic-based composite material according to a second embodiment.

In the second embodiment, in step S5, a pressure-receiving area that is pressed by pressurization is larger than a pressing area where the pressure plates 21 press the laminate 10. The pressure-receiving area is the top surface of the pressure plate 21 and is the area of a surface to which atmospheric pressure P1 is applied. The pressing area is the bottom surface of the pressure plate 21 and is the area of a surface where the pressure plate 21 applies a pressure P2 to the laminate 10. Specifically, the pressure plate 21 has a shape in which a flange portion is formed closer to the upper side of a main body portion for pressing the laminate 10. Since the pressing area is smaller than the pressure-receiving area, the pressure P2 applied at the pressing area is larger than the pressure P1 applied to the pressure-receiving area.

As described above, the processing method for the ceramic-based composite material according to the embodiments is understood as follows, for example.

A processing method for a ceramic-based composite material according to a first aspect is a processing method for the ceramic-based composite material in which the ceramic-based composite material is molded by layering sheets (prepregs 6) obtained by impregnating reinforced fibers (reinforced fiber sheets 1) with the slurry 4 containing the ceramic powder 2 and calcining the sheets after curing. The processing method includes a step S4 of layering the sheets in a layering direction to form the laminate 10, and a step S5 of covering the laminate 10 with the vacuum bag 23 and evacuating the inside of the vacuum bag 23 to mold a cured laminate. In the step S5 of molding the cured laminate, the slurry-removing material 20 for absorbing the excess slurry 4 is disposed with respect to the laminate 10, and the degassing circuit member (slurry-removing material 20) provided on at least one side of the laminate 10 and configured to discharge air bubbles generated inside the laminate 10 is disposed with respect to the laminate 10.

According to this configuration, in the step S5 of molding the cured laminate, the laminate 10 can be degassed while removing the excess slurry 4 in the laminate 10 by using the vacuum bag 23. Since the air bubbles caused by the slurry 4 generated inside the laminate 10 can be suitably removed, it is possible to suppress the occurrence of processing defects in the ceramic-based composite material. Further, since press processing using a die is not performed, an increase in the length of the facility required for molding can be suppressed.

As a second aspect, the slurry 4 contains the ceramic powder 2 described above serving as the solute and water serving as the solvent.

According to this configuration, even in a case where the slurry 4 contains moisture and thus air bubbles are easily formed during the molding, the air bubbles can be suitably removed because the degassing circuit member is provided. Note that the slurry 4 may contain a binder resin.

In a third aspect, in the step S5 of molding the cured laminate, the heater (heating mat 13) is disposed on the opposite side of the degassing circuit member with the laminate 10 interposed therebetween in the layering direction, the heating is performed from one side in the layering direction by the heater, and the degassing is performed from the other side in the layering direction via the degassing circuit member.

According to this configuration, the heating and curing can be started from a part of the laminate 10 closer to the heat source, and the degassing can be started from a part of the laminate 10 farther from the heat source. Thus, the air bubbles generated inside the laminate 10 can be suitably removed, and thus the formation of voids can be suppressed.

As a fourth aspect, in the step S5 of molding the cured laminate, a pressing plate (the pressure plate 21) for pressing the laminate 10 is disposed.

According to this configuration, the laminate 10 can be pressed and made more uniform by the pressing plate.

As a fifth aspect, the pressing plate includes through-holes formed through the plate thickness direction.

According to this configuration, the laminate 10 can be degassed via the pressure plate 21, and thus the formation of voids can be further suppressed.

As a sixth aspect, in the step S4 of forming the laminate 10, after layering the sheets, the slurry 4 is applied to the surface of the sheets.

According to this configuration, even in a case where gaps are formed in the composite material, the gaps can be filled by the slurry 4 by applying the slurry 4, and thus defects of the slurry 4 can be suppressed.

As a seventh aspect, in the step S4 of forming the laminate, after layering the sheets, the laminate is covered with a vacuum bag, and the inside of the vacuum bag is evacuated.

According to this configuration, even in a case where the composite material entrains air during layering, the air can be removed by performing the evacuation, and thus the formation of voids can be suppressed. Further, by performing the evacuation, the air can be removed and the excess slurry 4 can also be removed.

As an eighth aspect, in the step S5 of molding the cured laminate, a gas-permeable release film is disposed between the laminate and the degassing circuit member.

According to this configuration, the laminate 10 can be degassed via the release film, and thus the formation of voids can be further suppressed.

As a ninth aspect, in the step S5 of molding the cured laminate, the pressing plate (pressure plate 21) for pressing the laminate 10 is disposed, and, in the pressing plate, a pressure-receiving area that is subject to pressure by pressurization is larger than a pressing area where the laminate is pressed.

According to this configuration, the pressure P2 applied at the pressing area can be increased over the pressure P1 applied to the pressure-receiving area. Thus, pressurization of the laminate 10 can be suitably performed.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A processing method for a ceramic-based composite material in which the ceramic-based composite material is molded by layering sheets obtained by impregnating reinforced fibers with a slurry containing ceramic powder and calcining the sheets after curing, the processing method comprising:
   preparing the slurry;
   forming the sheets by immersing the reinforced fibers in a tank containing the slurry;
   layering the sheets in a layering direction to form a laminate; and
   covering the laminate with a vacuum bag and evacuating an inside of the vacuum bag to mold a cured laminate,
   wherein:
   in the forming the laminate, after the layering the sheets, the slurry is applied to a surface of the sheets; and
   in the molding the cured laminate, a slurry-removing material configured to absorb excess slurry is disposed with respect to the laminate, and a degassing circuit member provided on at least one side of the laminate and being configured to discharge air bubbles generated inside the laminate is disposed with respect to the laminate.

2. The processing method according to claim 1, wherein, in the molding the cured laminate, a pressing plate configured to press the laminate is disposed.

3. The processing method according to claim 2, wherein the pressing plate includes through-holes formed through a plate thickness direction.

4. The processing method according to claim 1, wherein the slurry contains the ceramic powder serving as a solute and water serving as a solvent.

5. The processing method according to claim 1, wherein, in the molding the cured laminate:
a heater is disposed on an opposite side of the degassing circuit member with the laminate interposed therebetween in the layering direction; and
heating is performed from one side in the layering direction by the heater, and degassing is performed from the other side in the layering direction via the degassing circuit member.

6. The processing method according to claim 1, wherein, in the forming the laminate, after the layering the sheets, the laminate is covered with the vacuum bag, and the inside of the vacuum bag is evacuated.

7. The processing method according to claim 1, wherein, in the molding the cured laminate, a gas-permeable release film is disposed between the laminate and the degassing circuit member.

8. The processing method according to claim 1, wherein:
in the molding the cured laminate, a pressing plate configured to press the laminate is disposed; and
in the pressing plate, a pressure-receiving area that is subject to pressure by pressurization is larger than a pressing area where the laminate is pressed.

* * * * *